(12) United States Patent
Hirvonen et al.

(10) Patent No.: US 7,103,213 B2
(45) Date of Patent: Sep. 5, 2006

(54) METHOD AND APPARATUS FOR CLASSIFYING AN OBJECT

(75) Inventors: David Hirvonen, Portland, OR (US); Theodore Armand Camus, Marlton, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 11/070,566

(22) Filed: Mar. 2, 2005

(65) Prior Publication Data

US 2005/0270286 A1    Dec. 8, 2005

Related U.S. Application Data

(60) Provisional application No. 60/549,203, filed on Mar. 2, 2004.

(51) Int. Cl.
*G06K 9/00* (2006.01)
(52) U.S. Cl. .................................. 382/154; 382/224
(58) Field of Classification Search ........ 382/153–154, 382/103–104, 224, 285, 209, 262–264; 348/143–149, 348/42, 47, 150–154, 160, 161, 169–172; 340/435–436, 903, 961, 937, 925, 555, 565, 340/425.5; 345/418–419
See application file for complete search history.

(56) References Cited

U.S. PATENT DOCUMENTS

| | | | | |
|---|---|---|---|---|
| 5,283,837 | A | * | 2/1994 | Wood ........................ 382/285 |
| 5,793,375 | A | * | 8/1998 | Tanaka ...................... 345/426 |
| 5,793,900 | A | * | 8/1998 | Nourbakhsh et al. ....... 382/263 |
| 5,809,161 | A | * | 9/1998 | Auty et al. ................ 382/104 |
| 6,396,535 | B1 | * | 5/2002 | Waters ....................... 348/159 |
| 6,956,469 | B1 | * | 10/2005 | Hirvonen et al. .......... 340/435 |
| 2004/0075654 | A1 | * | 4/2004 | Hsiao et al. ................ 345/418 |

OTHER PUBLICATIONS

Chang et al., Stero-Based Object Detection, Classification and Quantative Evaluation with Automotive Applications, IEEE 1063-6919/05, pp. 1-6.*

3D Scene Reconstruction and Object Recognition for use with Autonomously Guided Vehicles, IEEE 0-7803-3026-9/95, pp. 1219-1224.*

* cited by examiner

*Primary Examiner*—Ishrat Sherali
(74) *Attorney, Agent, or Firm*—Lowenstein Sandler PC

(57) ABSTRACT

A method and apparatus for classifying an object in an image is disclosed. A depth image is provided. At least one area of the depth image unsatisfactory for object identification are identified. A plurality of two-dimensional projections of surface normals in the depth image is determined without considering the unsatisfactory at least one area. One or more objects are classified based on the plurality of two-dimensional projections of surface normals.

20 Claims, 4 Drawing Sheets

US 7,103,213 B2

METHOD AND APPARATUS FOR CLASSIFYING AN OBJECT

CROSS-REFERENCE TO RELATED APPLICATIONS

This application claims the benefit of U.S. provisional patent application No. 60/549,203, filed Mar. 2, 2004, which is herein incorporated by reference.

BACKGROUND OF THE INVENTION

1. Field of the Invention

The present invention relates to artificial or computer vision systems, e.g. vehicular vision systems. In particular, this invention relates to a method and apparatus for detecting automobiles and pedestrians in a manner that facilitates collision avoidance.

2. Description of the Related Art

Collision avoidance systems utilize a sensor system for detecting objects in front of an automobile or other form of vehicle or platform. In general, a platform can be any of a wide range of bases, including a boat, a plane, an elevator, or even a stationary dock or floor. The sensor system may include radar, an infrared sensor, or another detector. In any event the sensor system generates a rudimentary image of the scene in front of the vehicle. By processing that imagery, objects can be detected. Collision avoidance systems generally identify when an object is in front of a vehicle, but usually do not classify the object or provide any information regarding the movement of the object.

Therefore, there is a need in the art for a method and apparatus that provides for differentiating detected objects.

SUMMARY OF THE INVENTION

The present invention describes a method and apparatus for classifying an object in an image. In one embodiment, a depth image is provided. At least one area of the depth image unsatisfactory for object identification are identified. A plurality of two-dimensional projections of surface normals in the depth image is determined without considering the unsatisfactory at least one area. One or more objects are classified based on the plurality of two-dimensional projections of surface normals.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

The present invention discloses in one embodiment a method and apparatus for classifying an object in a region of interest based on one or more features of the object. Detection and classification of pedestrians, vehicles, and other objects are important, e.g., for automotive safety devices, since these devices may deploy in a particular fashion only if a target of the particular type (i.e., pedestrian or car) is about to be impacted. In particular, measures employed to mitigate the injury to a pedestrian may be very different from those employed to mitigate damage and injury from a vehicle-to-vehicle collision.

Figure 1:
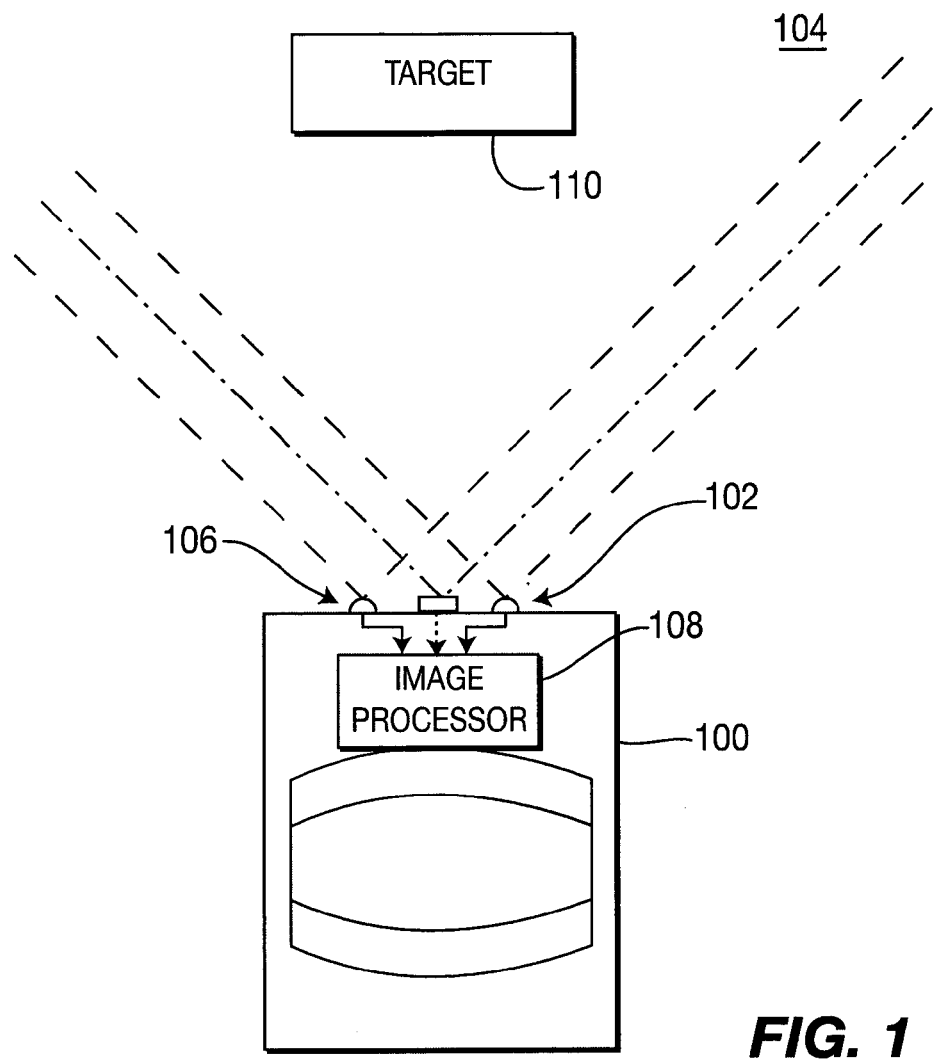
FIG. 1 depicts one embodiment of a schematic view of a vehicle utilizing the present invention.

FIG. 1 depicts a schematic diagram of a host, e.g., vehicle 100 having a target differentiation system 102 that differentiates a pedestrian (or pedestrians) 110 within a scene 104 that is proximate the vehicle 100. It should be understood that target differentiation system 102 is operable to detect pedestrians, automobiles, or other objects. While in the illustrated embodiment scene 104 is in front of vehicle 100, other object detection systems may image scenes that are behind or to the side of vehicle 100. Furthermore, target differentiation system 102 need not be related to a vehicle, but can be used with any type of platform, such as a boat, a plane, an elevator, or even stationary streets, docks, or floors. Target differentiation system 102 comprises a sensor array 106 that is coupled to an image processor 108. The sensors within the sensor array 106 have a field of view that includes one or more targets.

The field of view in a practical object detection system 102 may be ±12 meters horizontally in front of the vehicle 100 (e.g., approximately 3 traffic lanes), with a ±3 meter vertical area, and have a view depth of approximately 5–40 meters. (Other fields of view and ranges are possible, depending on camera optics and the particular application.) Therefore, it should be understood that the present invention can be used in a pedestrian detection system or as part of a collision avoidance system.

Figure 2:
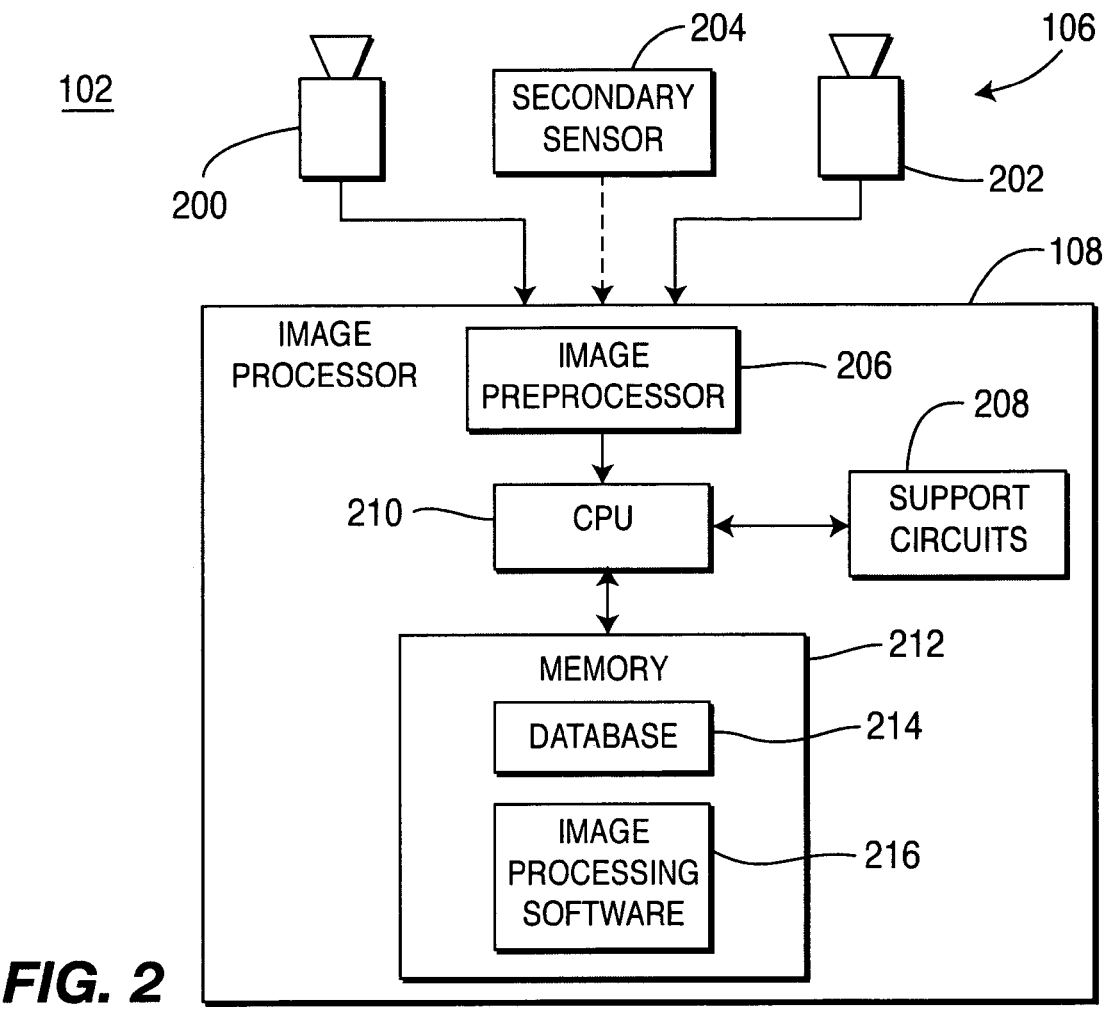
FIG. 2 depicts a block diagram of a vehicular vision system in accordance with one embodiment of the present invention.

FIG. 2 depicts a block diagram of hardware used to implement the target differentiation system 102. The sensor array 106 comprises, for example, a pair of cameras 200 and 202. In some applications an optional secondary sensor 204 can be included. The secondary sensor 204 may be radar, a light detection and ranging (LIDAR) sensor, an infrared range finder, a sound navigation and ranging (SONAR) senor, and the like. The cameras 200 and 202 generally operate in the visible wavelengths, but may be augmented with infrared sensors, or the cameras may themselves operate in the infrared range. The cameras have a known, fixed relation to one another such that they can produce a stereo image of the scene 104. Therefore, the cameras 200 and 202 will sometimes be referred to herein as stereo cameras.

Still referring to FIG. 2, the image processor 108 comprises an image preprocessor 206, a central processing unit (CPU) 210, support circuits 208, and memory 212. The image preprocessor 206 generally comprises circuitry for capturing, digitizing and processing the imagery from the sensor array 106. The image preprocessor may be a single chip video processor such as the processor manufactured under the model Acadia I™ by Pyramid Vision Technologies of Princeton, N.J.

The processed images from the image preprocessor 206 are coupled to the CPU 210. The CPU 210 may comprise any one of a number of presently available high speed microcontrollers or microprocessors. CPU 210 is supported by support circuits 208 that are generally well known in the art. These circuits include cache, power supplies, clock circuits, input-output circuitry, and the like. Memory 212 is also coupled to CPU 210. Memory 212 stores certain software routines that are retrieved from a storage medium, e.g., an optical disk, and the like, and that are executed by CPU 210 to facilitate operation of the present invention. Memory 212 also stores certain databases 214 of information that are used by the present invention, and image processing software 216 that is used to process the imagery from the sensor array 106. Although the present invention is described in the context of a series of method steps, the method may be performed in hardware, software, or some combination of hardware and software (e.g., an ASIC). Additionally, the methods as disclosed can be stored on a computer readable medium.

Figure 3:
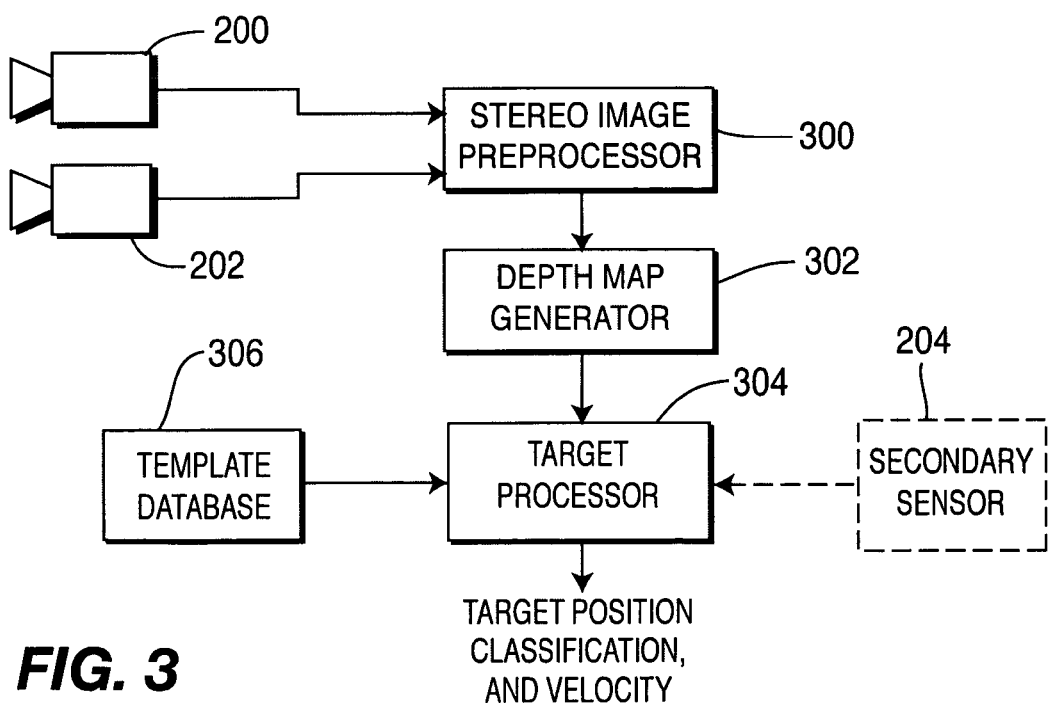
FIG. 3 depicts a block diagram of functional modules of the vision system of FIG. 2 in accordance with one embodiment of the present invention.

FIG. 3 is a functional block diagram of modules that are used to implement the present invention. The stereo cameras 200 and 202 provide stereo imagery to a stereo image preprocessor 300. The stereo image preprocessor is coupled to a depth map generator 302 which is coupled to a target processor 304. Depth map generator 302 may be utilized to define a region of interest (ROI), i.e., an area of the image that potentially contains a target 110. In some applications the depth map generator 302 is not used. In applications where depth map generator 302 is not used, ROIs would be determined using image-based methods. The following will describe the functional block diagrams under the assumption that a depth map generator 302 is used. The target processor 304 receives information from a target template database 306 and from the optional secondary sensor 204. The stereo image preprocessor 300 calibrates the stereo cameras, captures and digitizes imagery, warps the images into alignment, performs pyramid wavelet decomposition, and performs stereo matching, which is generally well known in the art, to create disparity images at different resolutions.

For both hardware and practical reasons, creating disparity images having different resolutions is beneficial when detecting objects. Calibration provides for a reference point and direction from which all distances and angles are determined. Each of the disparity images contains the point-wise motion from the left image to the right image and each corresponds to a different image resolution. The greater the computed disparity of an imaged object, the closer the object is to the sensor array.

The depth map generator 302 processes the multi-resolution disparity images into a two-dimensional depth image. The depth image (also referred to as a depth map) contains image points or pixels in a two dimensional array, where each point represents the depth (z coordinate in the camera coordinate system) of a point within the scene. The depth image is then processed by the target processor 304 wherein templates (models) of typical objects encountered by the vision system are compared to the information within the depth image. As described below, the template database 306 comprises templates of objects (e.g., automobiles, pedestrians) located at various locations and poses with respect to the sensor array.

An exhaustive search of the template database may be performed to identify the set of templates that most closely explain the present depth image. The secondary sensor 204 may provide additional information regarding the position of the object relative to the vehicle, velocity of the object, size or angular width of the object, etc., such that the target template search process can be limited to templates of objects at about the known position relative to the vehicle. If the secondary sensor is a radar sensor, the sensor can, for example, provide an estimate of both object location and velocity. The target processor 304 produces a target list that is then used to identify target size and classification estimates that enable target tracking and the identification of each target's position, classification and velocity within the scene. That information may then be used to avoid collisions with each target or perform pre-crash alterations to the vehicle to mitigate or eliminate damage (e.g., lower or raise the vehicle, deploy air bags, and the like).

Figure 4:
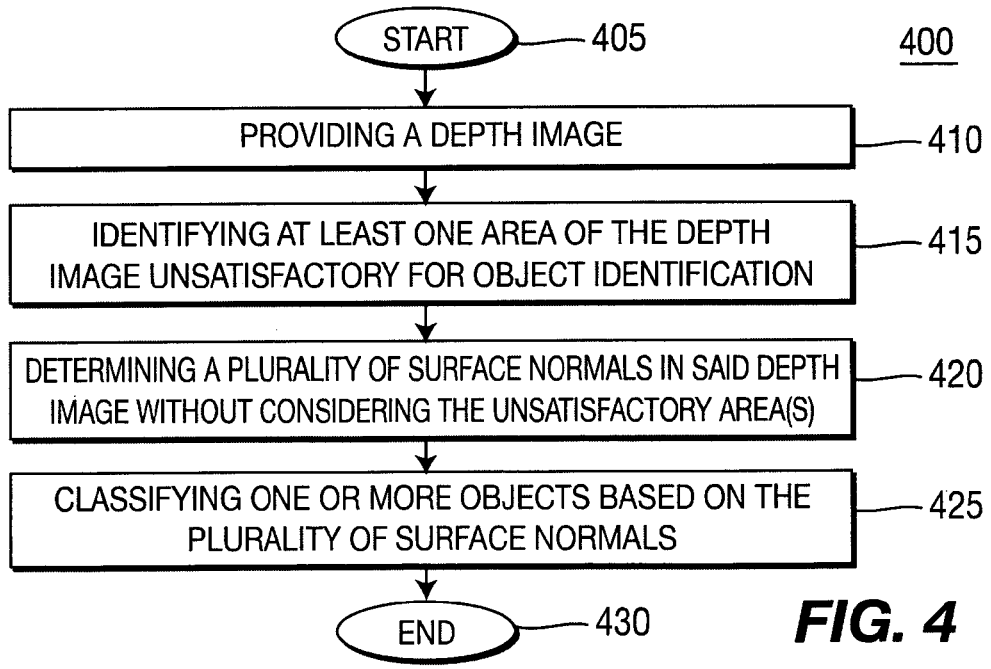
FIG. 4 illustrates a flow diagram in accordance with a method of the present invention.

FIG. 4 depicts a flow diagram of a method 400 for classifying an object in an image. The method 400 begins at step 405 and proceeds to step 410. In step 410, a depth image is provided. Depth images may be provided by depth map generator 302. As stated previously, depth map generator 302 processes multi-resolution disparity images into a two-dimensional depth image. The depth image may be represented in a three-dimensional "real-world" sense with three two-dimensional matrices representing the X, Y, and Z coordinates of each pixel in the left camera image, where X represents a three dimensional lateral coordinate, Y represents a three-dimensional vertical coordinate, and Z represents a three dimensional depth coordinate. The depth image may also be represented as a two-dimensional depth image (x, y), where x represents depth image column and y represents depth image row. The former representation can be obtained given the latter representation and the associated camera calibration information.

Figure 5:
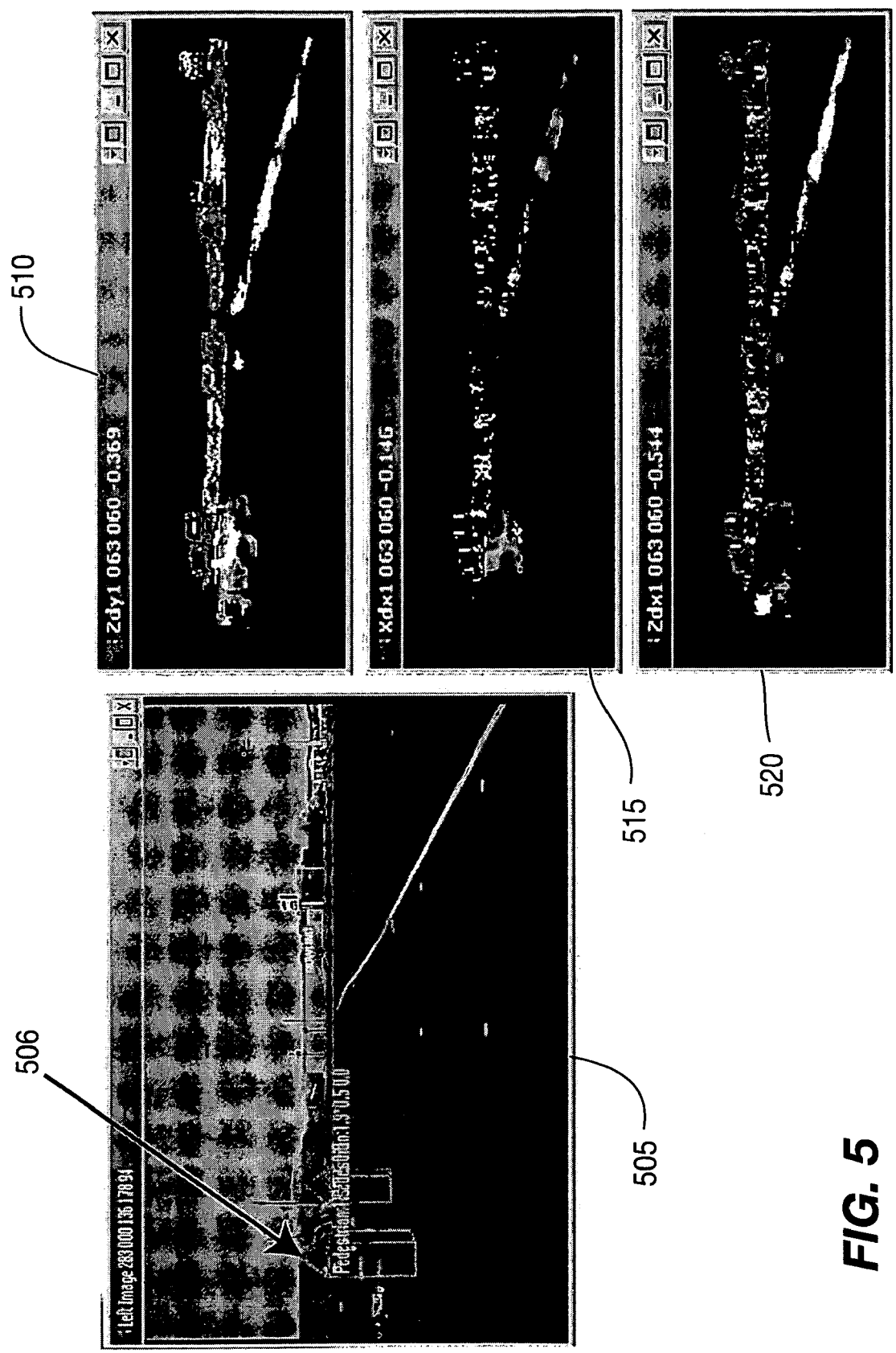
FIG. 5 illustrates an example of information derived from a depth image in accordance with one embodiment of the present invention.

FIG. 5 illustrates an example of parameters derived using the above Cartesian coordinates and depth image coordinates. An original stereoscopic image is shown in element 505 where a target 506 is misclassified as two pedestrians by a different classification algorithm. Parameter Zdy is a measure of how three-dimensional depth coordinate (Z) changes across a ⅓ meter vertical interval (projected into image rows (y)) and is shown in element 510, in which luminance values are assigned in proportion with the magnitude of the Zdy output. Parameter Ydy is a measure of how three-dimensional vertical coordinate (Y) changes across a ⅓ meter vertical interval (projected into image rows (y)). (A representative luminance map could be obtained for Ydy as was done for Zdy in element 510.) Parameter Xdx is a measure of how three-dimensional lateral coordinate (X) changes across a ⅓ meter horizontal interval (projected into image columns (x)) and is shown in element 515. Parameter Zdx is a measure of how three-dimensional depth coordinate (Z) changes across a ⅓ meter horizontal interval (projected into image columns (x)) and is shown in element 520. The measurement interval of ⅓ meter is appropriate for the application of detecting and discriminating targets such as pedestrians and vehicles, but can vary depending on the application.

In step 415, at least one area of the depth image that is unsatisfactory for object identification is identified. In one embodiment, parameter Zdy is determined for the depth image. Zdy is a measure of how three-dimensional depth coordinate (Z) changes across a ⅓ meter vertical interval (projected into image rows (y)). If the row being measured is at ground level, a high Zdy value is expected since the difference between ground and the horizon represents a significant change in three-dimensional depth (Z). Areas of the depth image having a high Zdy value are eliminated from consideration. A threshold is selected to determine high Zdy values based on knowledge of common road gradations and noise in the depth image. High Zdy values should correspond to flat regions in the scene. In one embodiment a threshold of 0.5 is chosen, and all pixels whose local Zdy value is greater than 0.5 are labeled as road pixels and thereby eliminated from consideration. As an alternative embodiment, Zdy may be used in combination with Ydy, to estimate an actual road pitch or ground plane angle, where Ydy is a measure of how three-dimensional vertical coordinate (Y) changes across a ⅓ meter vertical interval (projected into image rows (y)). Psi comprises the pitch angle of the road plane. Psi is determined according to the following formula:

$$\psi = A\tan 2(Ydy, Zdy)$$

where A tan 2 is a trigonometric function with two inputs, Ydy and Zdy. Areas of the depth image having a low pitch value (e.g., flat areas) are eliminated from consideration. A threshold is selected to determine low pitch values based on knowledge of common road gradations and noise in the depth image. Low pitch values should correspond to flat regions in the scene. In one embodiement a threshold of 0.3491 radians is chosen (20 degrees), and all pixels whose local pitch is less than 0.3491 are labeled as road pixels and thereby eliminated from consideration. High pitch values indicate the presence of an upright object on the road.

In step 420, a plurality of two-dimensional in-plane rotations (two-dimensional projections of surface normals) in the depth image is determined without considering the unsatisfactory area(s). Parameter Xdx is determined for the depth image. Xdx is a measure of how three-dimensional lateral coordinate (X) changes across a ⅓ meter horizontal interval (projected into image columns (x)). Parameter x may be incremented with respect to parameter X. For example, where a target 506 is in front of a host e.g., host 100 in an adjacent lane, an X value corresponding to the side of that target would change very little, if at all, when x is varied. Parameter Zdx is also determined for the depth image. Zdx is a measure of how three-dimensional depth coordinate (Z) changes across a ⅓ meter horizontal interval (projected into image columns (x)). Returning to the above example where target 506 is in front of a host in an adjacent lane, a Z value would change more dramatically since there is a corresponding change in depth along the side of target 506 as x is varied. Theta (θ) is then determined. Theta comprises the yaw angle of an upright surface. Theta is determined according to the following formula:

$$\theta = A\tan 2(Xdx, Zdx)$$

where A tan 2 is a trigonometric function with two inputs, Xdx and Zdx.

A plurality of theta (yaw) values, e.g., two-dimensional projections of surface normals in the X-Z plane is determined in areas of the depth image deemed satisfactory for object identification, e.g., areas having a low Zdy or a high Psi. Subsets of the plurality of two-dimensional projections of surface normals that are close in proximity and exhibit similar theta values are regarded as surfaces of one or more objects, e.g., a vehicle, a person, a wall, and so forth.

In step 425, one or more objects are classified based on the plurality of two-dimensional projections of surface normals. In one embodiment, one or more objects is classified as a side of a vehicle when a subset of the plurality of two-dimensional projections of surface normals is within 20 degrees of being orthogonal to the optical axis of a host, e.g., host 100. In one embodiment, an object is classified using object width when over fifty percent of a subset of said plurality of two-dimensional projections of surface normals are within 20 degrees of being orthogonal to the camera's optical axis. If an object is in an adjacent lane and there does not exist a significant subset of two-dimensional projections of surface normals orthogonal to the camera's optical axis (i.e., there is no visible sidewall) the object is likely to be a pedestrian.

Figure 6:
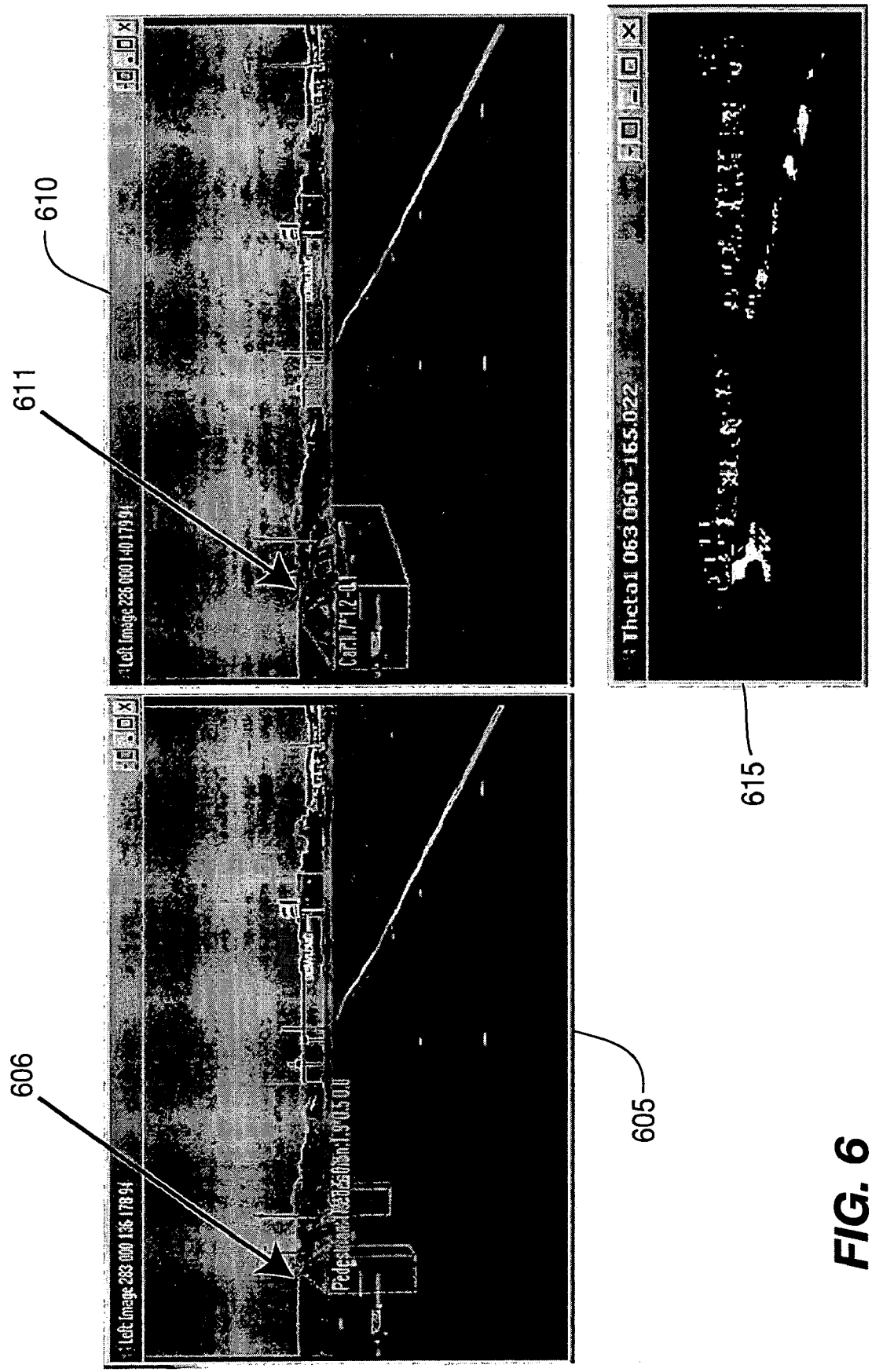
FIG. 6 illustrates an example of information derived from a depth image in accordance with one embodiment of the present invention.

FIG. 6 illustrates an example of parameters derived using the above Cartesian coordinates and depth image coordinates. An original stereoscopic image is shown in element 605 where a target 606 is misclassified as two pedestrians by a different classification algorithm. Element 610 illustrates that the system correctly identifies target 611 as a car using the A tan 2 function. In this example, the A tan 2 function returns an angle of −75° with respect to the camera's optical axis, which is very close to the expected orientation of the right side of a vehicle detected in front and off to the left of a host. Element 615 illustrates a depth image displaying computed theta values.

While the foregoing is directed to embodiments of the present invention, other and further embodiments of the invention may be devised without departing from the basic scope thereof, and the scope thereof is determined by the claims that follow.

The invention claimed is:

1. A method of classifying an object in an image, comprising:
   providing a depth image;
   identifying at least one area of said depth image unsatisfactory for object identification;
   determining a plurality of two-dimensional projections of surface normals in said depth image without considering said unsatisfactory at least one area; and
   classifying one or more objects based on the plurality of two-dimensional projections of surface normals.

2. The method of claim 1, wherein identifying areas of said depth image comprises determining Zdy where Zdy defines how three-dimensional depth coordinate (Z) changes across a ⅓ meter vertical interval projected into image rows.

3. The method of claim 2, wherein areas of said depth image are eliminated from consideration due to having a high Zdy.

4. The method of claim 1, wherein identifying areas of said depth image comprises determining pitch psi, where psi defines a pitch of a dominant road plane.

5. The method of claim 4, wherein areas of said depth image are eliminated from consideration due to having a low pitch psi.

6. The method of claim 1, wherein determining said plurality of two-dimensional projections of surface normals comprises:
   determining Xdx where Xdx defines how three-dimensional lateral coordinate (X) changes across a ⅓ meter horizontal interval projected into image columns;
   determining Zdx where Zdx defines how three-dimensional depth coordinate (Z) changes across a ⅓ meter horizontal interval projected into image columns; and
   determining theta using an A tan 2 function with Xdx and Zdx as parameters in areas of the depth image that are satisfactory for object identification.

7. The method of claim 6, wherein a subset of said plurality of two-dimensional projections of surface normals comprises a collection of theta within a certain threshold.

8. The method of claim 1, wherein classifying said one or more objects comprises classifying said one or more objects as a side of a vehicle when a subset of said plurality of two-dimensional projections of surface normals is approximately orthogonal to an optical axis of a host.

9. The method of claim 1, wherein classifying said one or more objects comprises classifying using object width when over fifty percent of a subset of said plurality of two-dimensional projections of surface normals are within a range of +/−20 degrees of being orthogonal to an optical axis of a host.

10. An apparatus for classifying an object in an image, comprising:
   means for providing a depth image;
   means for identifying at least one area of said depth image unsatisfactory for object identification;
   means for determining a plurality of two-dimensional projections of surface normals in said depth image without considering said unsatisfactory at least one area; and
   means for classifying one or more objects based on the plurality of two-dimensional projections of surface normals.

11. The apparatus of claim 10, wherein identifying areas of said depth image comprises determining Zdy where Zdy defines how three-dimensional depth coordinate (Z) changes across a ⅓ meter vertical interval projected into image rows.

12. The apparatus of claim 11, wherein areas of said depth image are eliminated from consideration due to having a high Zdy.

13. The apparatus of claim 10, wherein identifying areas of said depth image comprises determining pitch psi, where psi defines a pitch of a dominant road plane.

14. The apparatus of claim 13, wherein areas of said depth image are eliminated from consideration due to having a low pitch psi.

15. The apparatus of claim 10, wherein determining said plurality of two-dimensional projections of surface normals comprises:
   determining Xdx where Xdx defines how three-dimensional lateral coordinate (X) changes across a ⅓ meter horizontal interval projected into image columns;
   determining Zdx where Zdx defines how three-dimensional depth coordinate (Z) changes across a ⅓ meter horizontal interval projected into image columns; and
   determining theta using an A tan 2 function with Xdx and Zdx as parameters in areas of the depth image that are satisfactory for object identification.

16. The apparatus of claim 15, wherein a subset of said plurality of two-dimensional projections of surface normals comprises a collection of theta within a certain threshold.

17. The apparatus of claim 10, wherein classifying said one or more objects comprises classifying said one or more objects as a side of a vehicle when a subset of said plurality of two-dimensional projections of surface normals is approximately orthogonal to an optical axis of a host.

18. The apparatus of claim 10, wherein classifying said one or more objects comprises classifying using object width when over fifty percent of a subset of said plurality of two-dimensional projections of surface normals are within a range of +/−20 degrees of being orthogonal to an optical axis of a host.

19. A computer-readable medium having stored thereon a plurality of instructions, the plurality of instructions including instructions which, when executed by a processor, cause the processor to perform the steps of a method of classifying an object in an image, comprising:
   providing a depth image;
   identifying at least one area of said depth image unsatisfactory for object identification;
   determining a plurality of two-dimensional projections of surface normals in said depth image without considering said unsatisfactory at least one area; and
   classifying one or more objects based on the plurality of two-dimensional projections of surface normals.

20. The computer-readable medium of claim 19, wherein determining said plurality of two-dimensional projections of surface normals comprises:
   determining Xdx where Xdx defines how three-dimensional lateral coordinate (X) changes as a function of depth image column (x);
   determining Zdx where Zdx defines how three-dimensional depth coordinate (Z) changes across a ⅓ meter horizontal interval (projected into image columns (x)); and
   determining theta by using an A tan 2 function with Xdx and Zdx as parameters in areas of the depth image that are satisfactory for object identification.

* * * * *